(No Model.)
J. D. BROOKS.
Surface Condenser.
No. 237,674.        Patented Feb. 15, 1881.
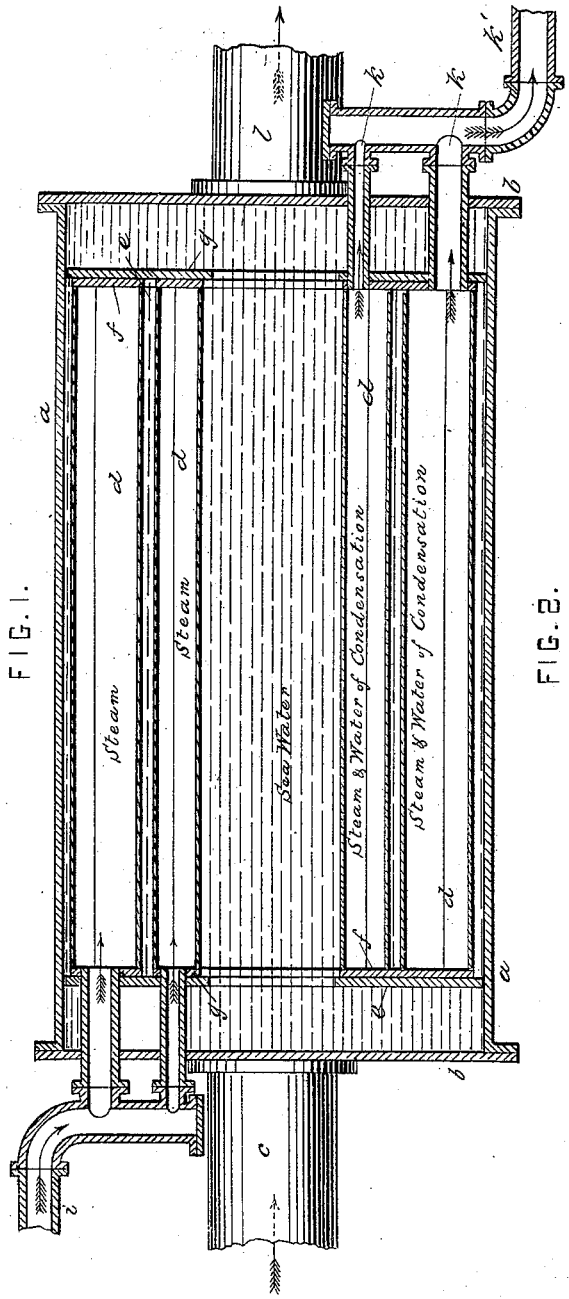
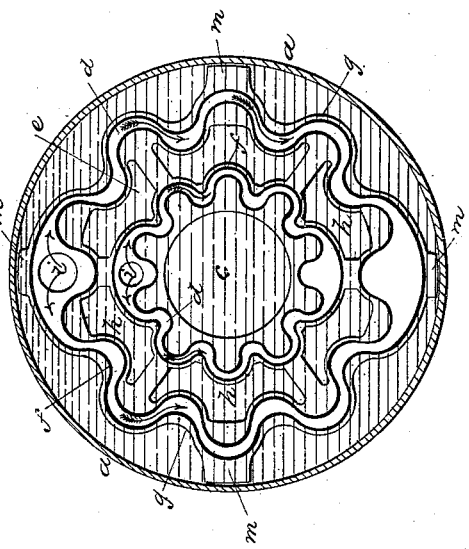
ATTEST:
Chas. M. Higgins
Jno. E. Gavin
INVENTOR=
John D. Brooks
by S.W. Wales &m
attys.

UNITED STATES PATENT OFFICE.

JOHN D. BROOKS, OF JERSEY CITY, NEW JERSEY.

SURFACE-CONDENSER.

SPECIFICATION forming part of Letters Patent No. 237,674, dated February 15, 1881.

Application filed April 1, 1880. (No model.)

*To all whom it may concern:*

Be it known that I, JOHN D. BROOKS, of Jersey City, Hudson county, New Jersey, have invented certain new and useful Improvements in Surface-Condensers, of which the following is a specification.

My invention aims to provide a surface-condenser, more especially for marine-engines, which will provide a large condensing-surface within a small space, and at the same time embody a simple and accessible construction. To this end my condenser is constructed with a concentric series of narrow steam-condensing spaces, each space being of annular corrugated form in cross-section, with intervening cold-water spaces of similar form, as hereinafter fully set forth.

Figure 1 of the annexed drawings gives a longitudinal section of my improved condenser, and Fig. 2 a cross-section thereof.

As illustrated, *a* indicates the external casing of the condenser, which may be of cast-iron or boiler-iron, and is preferably of cylindrical form with removable heads *b b*, as shown.
The sea-water is admitted to this casing by the inlet *c* at one end thereof, and after circulating through the same, as usual, discharges by the outlet *l* at the other end. Now, the steam is admitted to and condensed in a series of narrow annular spaces, *d d*, which are of corrugated or wavy conformation throughout their circumference, like the outline of a coarse cog-wheel, as seen best in Fig. 2, and these annular corrugated spaces are arranged in concentric series, one within the other, with intervening spaces *e* of corresponding form to admit the circulation or passage of the cold sea-water in contact with the corrugated walls of the narrow annular steam-spaces *d*.

I prefer to use three concentric steam-spaces of the kind described; but I have shown but two in the drawings for simplicity of illustration, but only one of the same may be used if preferred.

This form of condensing-chamber, as will be observed, obtains a very extended condensing-surface within a compact space, and exposes the steam in a narrow and extended sheet or mass to close proximity with a correspondingly-extended mass of cold water. The walls of the steam-spaces are formed of two large and long corrugated tubes or cylinders, of thin copper or brass, the ends of which are soldered or brazed to a metal ring, *f*, of nearly similar corrugated shape. (Seen best in Fig. 2.) These rings, with their attached steam-chambers, are bolted at each end, in a concentric arrangement, to perforated heads *g g*, having openings *h* between the steam-chambers to admit the free circulation of the cold water in contact therewith, as shown in Figs. 1 and 2. The series or group of steam-chambers is much smaller than the inclosing water-chamber *a*, so as to leave a circumferential water-space around the former; and the perforated heads *g g* have four radial projections or feet, *m*, which rest in loose contact with the interior of the water-chamber, and support the steam-chambers centrally therein, yet in such manner that the steam-chambers may be easily removed when the head of the water-chamber *a* is taken off, thus rendering the internal parts accessible for examination or repair.

The steam is admitted to the top of the steam-condensing chambers by the pipe *i*, which branches into three minor pipes, each going to a distinct chamber, while a distinct pipe, *k*, also extends from the bottom of each chamber and connects to a main pipe, *k'*, by which the water of condensation is carried off.
It will be observed from Fig. 2 that the outer walls of each steam-chamber is bowed with an additional outward corrugation where the steam and water pipes *i k* connect, thus obtaining sufficient space to connect such pipe while leaving the remainder of the chamber quite narrow, as is desirable.

By the described construction, as may be now observed, the formation of the condenser is rendered simple, its parts are accessible, when desired, and at the same time its condensing power is quick and effective.

What I claim as my invention is—

1. A surface-condenser formed with an inclosing cold-water chamber, in combination with an internal steam-condensing chamber of annular sinuous form in cross-section, substantially as herein shown and described.

2. A surface-condenser constructed with an inclosing cold-water chamber, in combination with a series of steam-condensing chambers of annular sinuous form in cross-section, arranged concentrically one within the other, with intervening cold-water spaces between the same of annular sinuous form in cross-sections, substantially as herein shown and described.

3. In a surface-condenser, the combination of the steam-chambers $d\ d$, annular in cross-sections, the supporting end rings, $f\ f$, perforated heads $g\ g$, and inclosing-chamber $a$, substantially as and for the purpose set forth.

4. The combination of the inclosing-chamber $a$, with removable head or heads $b$, with the internal removable condensing-chambers, consisting of the chambers $d\ d$, annular in cross-sections, the supporting end rings $f$, and perforated heads $g\ g$, substantially as herein specified.

JOHN D. BROOKS.

Witnesses:
EDWARD H. WALES,
CHAS. M. HIGGINS.